US010443529B2

(12) United States Patent
Hill

(10) Patent No.: US 10,443,529 B2
(45) Date of Patent: Oct. 15, 2019

(54) VEHICULAR LIQUID CONTAINMENT SYSTEM AND METHOD FOR VERIFYING INTEGRITY OF SAME

(71) Applicant: PLASTIC OMNIUM ADVANCED INNOVATION AND RESEARCH, Brussels (BE)

(72) Inventor: David Hill, Commerce Township, MI (US)

(73) Assignee: PLASTIC OMNIUM ADVANCED INNOVATION AND RESEARCH, Brussels (BE)

( * ) Notice: Subject to any disclaimer, the term of this patent is extended or adjusted under 35 U.S.C. 154(b) by 228 days.

(21) Appl. No.: 15/301,648

(22) PCT Filed: Apr. 1, 2015

(86) PCT No.: PCT/EP2015/057180
§ 371 (c)(1),
(2) Date: Oct. 3, 2016

(87) PCT Pub. No.: WO2015/150455
PCT Pub. Date: Oct. 8, 2015

(65) Prior Publication Data
US 2017/0022920 A1   Jan. 26, 2017

Related U.S. Application Data

(60) Provisional application No. 61/975,486, filed on Apr. 4, 2014.

(30) Foreign Application Priority Data

May 20, 2014   (EP) .................................... 14169163

(51) Int. Cl.
*F02D 41/22*   (2006.01)
*G01M 3/00*   (2006.01)
(Continued)

(52) U.S. Cl.
CPC ........... *F02D 41/22* (2013.01); *F02D 33/003* (2013.01); *F02M 37/0082* (2013.01);
(Continued)

(58) Field of Classification Search
CPC .. F02D 41/22; F02D 33/003; F02D 2041/255; G08B 21/182; G01F 23/248;
(Continued)

(56) References Cited

U.S. PATENT DOCUMENTS 4,852,054 A   7/1989   Mastandrea
5,022,263 A   6/1991   Uriu et al.
(Continued)

FOREIGN PATENT DOCUMENTS

EP   2 014 904 A2   1/2009
JP   6-147035 A   5/1994
(Continued)

OTHER PUBLICATIONS

International Search Report dated Jul. 17, 2015 in PCT/EP2015/057180 filed Apr. 1, 2015.
(Continued)

*Primary Examiner* — Tarun Sinha
(74) *Attorney, Agent, or Firm* — Oblon, McClelland, Maier & Neustadt, L.L.P.

(57) ABSTRACT

A vehicular liquid containment system including a tank, a pressure sensor arranged to detect a pressure in a vapor dome inside the tank, at least two thermistors configured to detect temperatures at a plurality of levels of the tank, and leak detection logic operatively connected to the pressure sensor and the thermistors. The leak detection logic is configured to: use a first thermistor of the thermistors to perform a first measurement indicative of a temperature in the vapor dome in the tank; estimate an expected pressure evolution in function of at least the first temperature mea-
(Continued)

Figure 1:
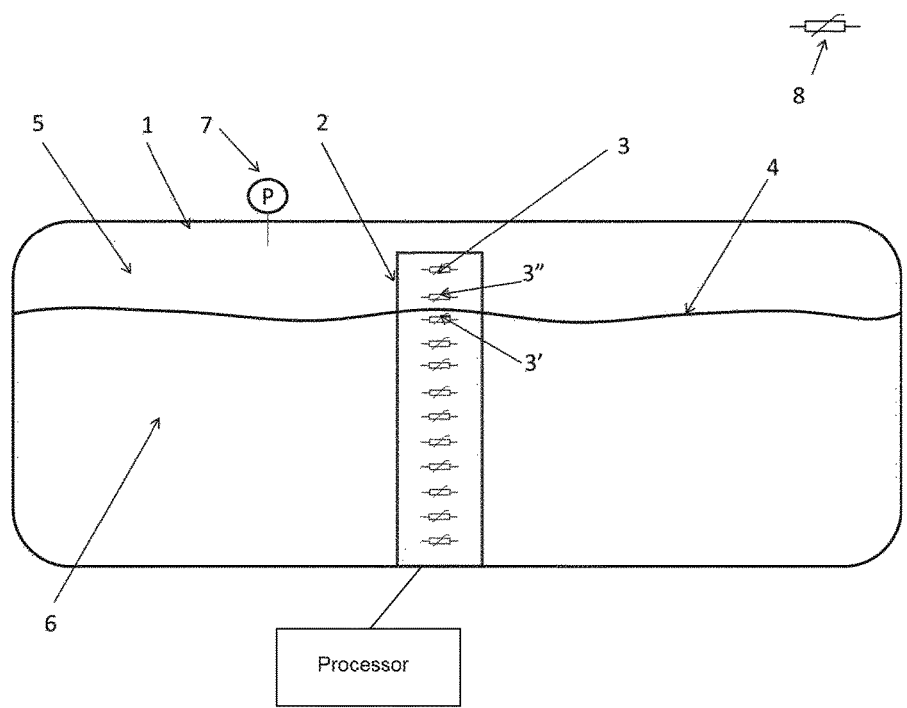

surement; monitor pressure sensed by the pressure sensor, determine whether the monitored pressure deviates from the expected pressure evolution, and generate a leak condition signal conditional on the determining.

16 Claims, 2 Drawing Sheets

(51) Int. Cl.
    *G01M 3/32*     (2006.01)
    *F02M 37/00*     (2006.01)
    *F02D 33/00*     (2006.01)
    *G01F 23/24*     (2006.01)
    *G08B 21/18*     (2006.01)

(52) U.S. Cl.
    CPC ........... *G01F 23/248* (2013.01); *G01M 3/002* (2013.01); *G01M 3/3245* (2013.01); *G01M 3/3272* (2013.01); *G08B 21/182* (2013.01); *F02D 2041/225* (2013.01)

(58) Field of Classification Search
    CPC ............ F02M 37/0082; G01M 3/3272; G01M 3/3245; G01M 3/002

USPC ...................................................... 73/40.5 R
See application file for complete search history.

(56) References Cited

U.S. PATENT DOCUMENTS

| | | |
|---|---|---|
| 5,156,042 A | 10/1992 | Carlin et al. |
| 6,098,457 A | 8/2000 | Poole |
| 6,662,650 B1 | 12/2003 | Durkee et al. |
| 7,448,367 B1 | 11/2008 | Reddy et al. |
| 7,698,939 B2 | 4/2010 | Bremmer et al. |
| 2004/0200277 A1 | 10/2004 | Feldstein et al. |
| 2013/0074583 A1 | 3/2013 | Perry |

FOREIGN PATENT DOCUMENTS

| | | |
|---|---|---|
| JP | 2000-110673 A | 4/2000 |
| JP | 2007-224804 A | 9/2007 |
| JP | 2007-278108 A | 10/2007 |
| WO | WO 2014/095601 A1 | 6/2014 |

OTHER PUBLICATIONS

Office Action dated Aug. 27, 2018 in Japanese Patent Application No. 2016-560774 (with English language translation).

VEHICULAR LIQUID CONTAINMENT SYSTEM AND METHOD FOR VERIFYING INTEGRITY OF SAME

FIELD OF THE INVENTION

The present invention pertains to the field of vehicular liquid containment systems, in particular fuel storage systems, and in particular to leak detection systems.

BACKGROUND

In the field of vehicular fuel systems, it is known to use arrays of thermistors inside a fuel tank to determine the level of the stored liquid fuel, by detecting the difference in temperature at different thermistors of the array. This difference is caused by the fact that some thermistors are submersed in liquid fuel, while others are in the vapor dome above the liquid surface, such that they are surrounded by media with different heat capacities.

U.S. Pat. No. 7,698,939 discloses a system for sensing a fuel level, including sensors that sense the fuel level and a voltage source that applies a constant voltage to the sensors for a predetermined time. The system includes a control module that measures outputs of the sensors at a beginning and at an end of the predetermined time. The control module determines a number of the sensors that are submersed in fuel or air based on the outputs and calculates the fuel level based on the number of the sensors that are submersed in fuel or air.

U.S. Pat. No. 6,662,650 discloses a method of detecting a dry/wet state of a dual thermistor bead sensor over a wide operating temperature range, comprising the steps of: conducting first and second predetermined currents through one and another of the thermistor beads of the sensor, respectively, the second predetermined current being substantially less than the first predetermined current; measuring a first voltage across the one thermistor bead in response to the first predetermined current and generating a first signal representative thereof; measuring a second voltage across the other thermistor bead in response to the second predetermined current and generating a second signal representative thereof; modifying the second signal by an offset and gain to generate a third signal; and detecting the dry/wet state of the sensor over the wide operating temperature range based on the first and third signals. The first predetermined current is conducted through the one thermistor bead at an average current which renders the one thermistor bead a sense thermistor bead, and the second predetermined current is conducted through the other thermistor bead at an average current which renders the other thermistor bead a reference thermistor bead.

US 2004/0200277 discloses a level detector for storage tanks for fluids, comprising a microprocessor, a network of resistive elements connected in series or parallel, and a plurality of conductive elements between them, connected across a power source. The resistive elements have a high temperature coefficient, and are heated by passing a high electric current through them, after which a low electric current is passed through them and the voltage between them is sampled by the microprocessor. The resistive elements lose heat through conduction, so that a pair of resistive elements can be detected having differential cooling between them as a consequence of being adjacent to the void within the tank or the fluid within the tank. Thus, an approximation of the fluid level within the storage tank can be determined and signaled remotely.

U.S. Pat. No. 6,098,457 discloses a fluid level detector, comprising a substrate formed of a heat-insulative material and one or more thermoresistive sensor elements located on the substrate that is adapted to be immersed in a fluid. A current source is connected to the sensor element for producing a current through the sensor element during a predetermined time period. The current heats the sensor element and causes a change in voltage across the sensor element at least during the time period. The amount of change in voltage during the time period is reflective of the fluid level, since the fluid serves as a heat sink for the sensor element. The voltage is measured across the sensor element and a voltage slope is determined. The determined voltage slope is indicative of fluid level.

U.S. Pat. No. 5,022,263 discloses a fuel quantity detector for detecting the quantity of remaining fuel in a fuel tank of an automobile or the like, intended to detect at any environmental temperature or fuel temperature, accurately the quantity of the remaining fuel with a low current and high reliability and to eliminate defects of thermistor system or metallic wire system detectors. A heat-sensitive resistance bulb having a large resistance temperature coefficient for self-heat generation is formed on a support substrate and a change in the heat-sensitive resistance due to cooling of the portion dipped into the fuel by the heat of vaporization is detected as a differential output voltage. A heat-sensitive resistance bulb for correcting temperature is disposed on the support substrate in order to prevent any error of the differential output voltage that may be caused by the correction of the temperature inside the fuel tank.

The existing solutions are used for level sensing only.

According to an aspect of the invention, there is provided a vehicular liquid containment system comprising a tank, a pressure sensor arranged to detect a pressure in a vapor dome inside the tank, at least two thermistors arranged to detect temperatures at a plurality of levels of the tank, and leak detection logic operatively connected to the pressure sensor and the thermistors, the leak detection logic being configured to: use a first thermistor of the thermistors to perform a first measurement indicative of a temperature in a vapor dome in the tank; estimate an expected pressure evolution in function of at least the first temperature measurement; monitor pressure sensed by the pressure sensor; determine whether the monitored pressure deviates from the expected pressure evolution; and generate a leak condition signal, conditional on the determining.

Throughout this application, the vehicular liquid containment system may in particular be a vehicular fuel storage system.

The present invention is based inter alia on the insight of the inventors that thermistors can be advantageously used to more accurately determine the state of the fluids (both liquid and vapor/air) in a tank, and that this state information can lead to a better prediction of the expected pressure evolution. This reduces the chance of obtaining false negatives or false positives when using the observed pressure evolution to detect leak conditions.

In the system according to the present invention, the leak detection logic is further configured to use a second thermistor to perform a second measurement indicative of a temperature in a volume of liquid contained in the tank, and the estimating further occurs in function of at least the second temperature measurement.

The expected pressure evolution can be predicted more accurately if the temperatures of both the vapor phase and the liquid phase are taken into account. The thermistors are positioned at different levels in the tank, such that there is normally at least one thermistor submersed in the volume of liquid (or at a corresponding level on the outside of the tank) and at least one thermistor exposed to the vapor dome (or at a corresponding level on the outside of the tank).

In a particular embodiment, the leak detection logic is further configured to:
- at an instant when the vehicle is not running (i.e. engine off), perform a measurement indicative of a quantity of liquid in said tank,
- estimate said expected pressure evolution further in function of said measurement indicative of a quantity of liquid in said tank,
- detect an event corresponding to a vehicle start,
- if a vehicle start is detected, then detect an event corresponding to a predetermined movement of liquid in said tank (i.e. predetermined slosh event preferably determined by the indication of fuel movement or inferred by the vehicle's acceleration.),
- if a predetermined movement of liquid in said tank is detected, then determine whether said monitored pressure deviates from said expected pressure evolution.

The expected pressure evolution can be predicted more accurately if the vapor phase, the liquid phase and the quantity of liquid in the tank (i.e. thermal mass) are taken into account.

In yet another embodiment, the vehicular liquid containment system according to the invention further comprises means to introduce heat in a liquid phase of said tank, wherein the leak detection logic is further configured to activate the means to introduce heat, and wherein the monitoring of the pressure comprises monitoring the pressure subsequent to said activation of the means to introduce heat.

In an embodiment, the vehicular liquid containment system according to the invention further comprises means to promote heat transfer from a liquid phase inside the tank to a vapor phase inside the tank, wherein the leak detection logic is further configured to activate the means to promote heat transfer, and wherein the monitoring the pressure comprises monitoring the pressure subsequent to the activation of the means to promote heat transfer.

When liquid fuel is present in the liquid containment system, the space not occupied by liquid fuel will be filled with a gas mixture that contains an amount of fuel vapor, which is dependent on the temperature and the volatility of the fuel. This space is therefore referred to as the "vapor dome". The mass of liquid fuel will be referred to as the "liquid phase", and the gaseous fuel present in the vapor dome above the liquid phase will be referred to as the "vapor phase".

It is an advantage of these embodiments, that the environment inside the tank can be conditioned to a state in which anomalies (leaks) can be more readily observed. For instance, if the pressure in the vapor dome is artificially raised (by increasing the temperature of the vapor phase by means of heat introduced into it or transferred to it from the liquid phase), it will be possible to observe whether and at what rate the pressure decays, and to compare this observation to non-leak conditions.

In a particular embodiment, the means to promote heat transfer comprises a pump arranged to pump a liquid from the tank to a vehicular system via a feed line and a sprayer arranged within a branch of the feed line, the outlet of the sprayer being arranged inside the tank, the leak detection logic is configured to operate the pump to activate the sprayer, and the monitoring the pressure comprises monitoring the pressure subsequent to the activation of the sprayer.

In an embodiment, the vehicular liquid containment system according to the invention is further configured to determine a volatility of a liquid in the system on the basis of an increase in pressure observed when the system is known to be sealed.

It is an advantage of this embodiment that the various observed state variables of the system (temperatures, pressure of the gas phase) can be used to accurately determine or predict the volatility of the liquid phase inside the tank, because the expected vapor pressure at equilibrium for any given fuel volatility is known. The system preferably includes sensors or a registers that track the state of various input and output valves to ascertain that the liquid containment volume is in a sealed state when the volatility determination is performed.

In a particular embodiment, the thermistors are arranged to form a thermistor array. It is an advantage of the present invention that thermistor arrays, which were hitherto only used for fuel level detection, and which are often prohibitively expensive in view of their single purpose, can now be used as part of the leak detection system, rendering the latter much more accurate. Hence, the present invention is particularly advantageous in vehicle designs in which a thermistor array is already present.

According to an aspect of the invention, there is provided a motor vehicle comprising the vehicular liquid containment system as described above.

According to an aspect of the invention, there is provided a method for verifying the integrity of a vehicular liquid containment system comprising a tank, a pressure sensor arranged to detect a pressure in a vapor dome inside the tank, and at least two thermistors with a first thermistor arranged to detect a temperature at a first level of the tank and a second thermistor arranged to detect a temperature at a second level of the tank, the method comprising: using the first thermistor to perform a first measurement indicative of a temperature in a vapor dome in the tank and using the second thermistor to perform a second measurement indicative of a temperature in a volume of liquid contained in the tank; estimating an expected pressure evolution in function of at least the first temperature measurement and at least the second temperature measurement; monitoring pressure sensed by the pressure sensor, and determining whether the monitored pressure deviates from the expected pressure evolution.

In an embodiment, the method further comprises:
- at an instant when the vehicle is not running, perform a measurement indicative of a quantity of liquid in said tank,
- estimating said expected pressure evolution further in function of said measurement indicative of a quantity of liquid in said tank,
- detecting an event corresponding to a vehicle start,
- if a vehicle start is detected, then detect an event corresponding to a predetermined movement of liquid in said tank,
- if a predetermined movement of liquid in said tank is detected, then determining whether said monitored pressure deviates from said expected pressure evolution.

Advantageously, the step of performing a measurement indicative of a quantity of liquid in said tank and the step of detecting an event corresponding to a predetermined movement of liquid in said tank, are performed by using the thermistors.

In an embodiment of the method according to the present invention, the vehicular liquid containment system further comprises means to introduce heat in a liquid phase of said tank, the method further comprising activating the means to introduce heat, wherein the monitoring of the pressure comprises monitoring the pressure subsequent to the activation of the means to introduce heat.

In an embodiment of the method according to the present invention, the vehicular liquid containment system further comprises means to promote heat transfer from a liquid phase inside the tank to a vapor phase inside the tank, the method further comprising activating the means to promote heat transfer, wherein the monitoring the pressure comprises monitoring the pressure subsequent to the activation of the means to promote heat transfer.

In a particular embodiment, the means to promote heat transfer comprises a pump arranged to pump a liquid from the tank to a vehicular system via a feed line and a sprayer arranged within a branch of the feed line, the outlet of the sprayer being arranged inside the tank, the method comprising operating the pump to activate the sprayer, wherein the monitoring the pressure comprises monitoring the pressure subsequent to the activation of the sprayer.

In an embodiment, the method according to the present invention further comprises determining a volatility of a liquid in the system on the basis of an increase in pressure observed when the system is known to be sealed.

According to an aspect of the invention, there is provided a computer program product comprising code means configured to cause a processor to carry out the steps of the method as described above.

The technical effects and advantages of embodiments of the method and computer program product according to the present invention correspond, mutatis mutandis, to those of the corresponding embodiments of the method according to the present invention.

Unpublished international patent application no. PCT/EP2013/076484 in the name of the present applicant describes a vehicular liquid containment system comprising a tank, a pump arranged to pump a liquid from said tank to a vehicular system via a feed line, a pressure sensor arranged to detect a pressure in a vapor dome inside said tank, and a sprayer arranged within a branch of said feed line, the outlet of said sprayer being arranged inside said tank. It also describes a method for verifying the integrity of a vehicular liquid containment system as described above, the method comprising operating the pump to activate the sprayer, monitoring pressure sensed by said pressure sensor subsequent to said activation of said sprayer, and determining whether said monitored pressure deviates from a predetermined pressure evolution based on one or more measurements.

Figure 2:
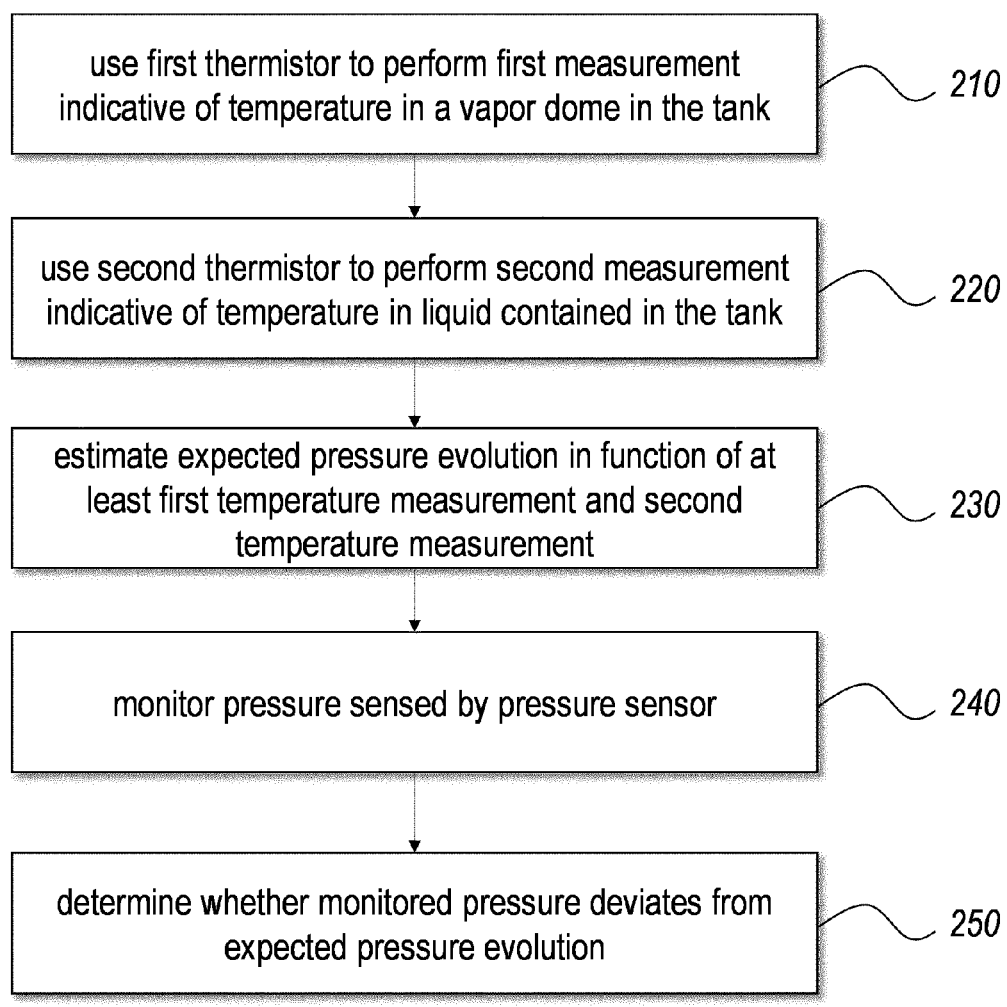

These and other aspects and advantages of the present invention will now be described in more detail with reference to the accompanying drawings, in which:

FIG. 1 schematically represents a vehicular liquid containment system according to any embodiment of the present invention; and FIG. 2 provides a flow chart representing an embodiment of the method according to the present invention.

In known leak-detection methods, it is often difficult to accurately determine the pressure evolution, in particular the initial pressure and/or pressure decay rate, that would be indicative of a normal (non-leak) condition. Accordingly, there is a need to improve the accuracy of such predictions. The inventors have found that one way of improving the accuracy of the predicted evolution is by using information about the temperature of the vapor in the tank, and preferably also information about the temperature and the volume of liquid in the tank. The inventors have further found that thermistors can efficiently provide all the relevant information.

It is noted that some known leak detection methods rely on naturally occurring temperature cycles, while others rely on the deliberate injection of heat into the fuel tank. Of the latter category, some systems rely on heat generated by the operation of the internal combustion engine of a vehicle, and such systems can clearly not be used in situations where there is no internal combustion engine available, or where the internal combustion engine typically remains inactive for long periods of time, as is the case in electrical and hybrid vehicles, respectively.

In embodiments of the present invention, one or more thermistors are used to determine the properties of the vapor in the vapor dome of a fuel tank including its temperature relative to the bulk fuel, and its heat capacity relative to the ambient temperature in the vapor dome in order to infer the molar fraction of hydrocarbons in the vapor space relative to air. This allows a prediction of vapor pressure for leak detection purposes.

FIG. 1 shows an embodiment of the invention in which a fuel tank 1 has a thermistor array 2 arranged within its interior. The thermistor array 3 is used to determine the level of the fuel in the tank 4 by measuring the resistance of each of the thermistors 3. Since the heat capacity in the liquid portion of the tank 5 and the vapor portion 6 are very different, the thermistors in the associated phases 3', 3" will read different voltage drops when the same power is applied to them.

Preferably, the same thermistors 3',3" are used in a passive mode to determine the temperature of the fuel in the liquid portion 6 and in the vapor portion 5 (and optionally also near the surface 4). Based on these temperatures, the temperature of equilibrium can be determined. Using the gas laws, the pressure change due to a temperature change in the vapor portion 5 can be predicted. This prediction can then be used to determine whether the volume of the fuel tank 1 is truly a closed volume, or if there is a leak. More importantly, it can help to determine whether the conditions are right to measure a leak via pressure.

By integrating the vehicle's ambient temperature sensor 8, the pressure inside the tank can determined to be stable, or likely to undergo a change. For example, if the liquid temperature, vapor temperature and ambient temperature are all the same, it can be predicted that there is a lower chance of pressure generation in the near future than if there were a large difference between at least two of these temperatures.

Embodiments of the invention which include means to condition the temperature (and hence, the pressure) of the vapor dome are of particular interest to these categories of vehicles. This includes embodiments having means to introduce heat into the tank and/or to promote heat transfer from a liquid phase inside the tank to a vapor phase inside the tank, which means may in particular comprise a fuel pump which is activated in order to heat the liquid in the fuel tank. In another particular embodiment, the system may comprise a pump arranged to pump a liquid from the tank to a vehicular system via a feed line and a sprayer arranged within a branch of the feed line, the outlet of the sprayer being arranged inside the tank. This has the effect of transferring heat energy between the liquid phase and the vapor phase. A pump/sprayer system is described in more detail in the European patent application no. PCT/EP2013/076484 in the name of the present applicant, the contents of which, in particular the description of FIGS. 1 and 2, are incorporated by this reference for the purpose of providing details of this embodiment.

The measured temperature difference between the phases within the tank can help in predicting the effectiveness of heating the fuel or spraying it into the vapor dome in generating pressure within the tank. If the liquid fuel temperature is substantially less than the vapor temperature then spraying fuel into the vapor dome should decrease the pressure in the closed volume. Conversely, if the fuel temperature is higher than the vapor temperature the pressure in the vapor dome should increase. Based on thermodynamic properties, this can be further quantified to not only determine that there is a leak in the system, but furthermore the size of that leak can be derived.

In a further step the heat capacity of the vapor phase can be measured using one or more steps of supplying a regulated voltage to the thermistor for a predetermined amount of time and measuring the resistance of the thermistor at Time 0 and Time t.

In yet another step several thermistors in the vapor portion can perform the steps in parallel, to increase the resolution.

In order to check the functionality of the sensors and to increase reliability of the measurements, several sensors in one or each particular portion (liquid or vapor) may be compared both before and after supplying energy to them.

FIG. 2 provides a flow chart representing an embodiment of the method according to the present invention. In a first step 210, a first thermistor 3" is used to perform a first measurement indicative of a temperature in a vapor dome in the tank 1. In a second, optional step 220, which may be carried out sequentially (in any order) or synchronously with the first step 210, a second thermistor 3 is used to perform a second measurement indicative of a temperature in a volume of liquid contained in the tank 1. In step 230, an expected pressure evolution is estimated in function of at least the first temperature measurement and optionally the second temperature measurement. Optionally, further measurements performed by means of the thermistor array can inform the estimate of the expected pressure evolution. These measurements may include the volume and heat capacity measurements described above with reference to FIG. 1. In step 240, the pressure sensed by the pressure sensor 7 is monitored, to determine 250 whether the monitored pressure deviates from the expected pressure evolution. If a deviation is found, a leak signal may be emitted.

The method may be carried out under the control of logic implemented as a dedicated hardware component (e.g., an ASIC), a configurable logic component (e.g., an FPGA), an appropriately programmed processor, or a combination of such components. The present invention also relates to software, which, when executed by a processor, causes the latter to perform the methods described herein. The processor may be included in the vehicle's ECU.

While the invention has been described hereinabove with reference to separate system and method embodiments, this was done for clarifying purposes only. The skilled person will appreciate that features described in connection with the system or the method alone, can also be applied to the method or the system, respectively, with the same technical effects and advantages. Furthermore, the scope of the invention is not limited to these embodiments, but is defined by the accompanying claims.

The invention claimed is:

1. A vehicular liquid containment system comprising:
   a tank;
   a pressure sensor configured to detect a pressure in a vapor dome inside the tank;
   at least two thermistors configured to detect temperatures at a plurality of levels of the tank; and
   leak detection logic processor operatively connected to the pressure sensor and the thermistors, the leak detection logic configured to:
   use a first thermistor to perform a first measurement indicative of a temperature in the vapor dome in the tank and use a second thermistor to perform a second measurement indicative of a temperature in a volume of liquid contained in the tank,
   estimate an expected pressure evolution in function of at least the first temperature measurement and at least the second temperature measurement,
   monitor pressure sensed by the pressure sensor,
   determine whether the monitored pressure deviates from the expected pressure evolution, and
   generate a leak condition signal based on whether the monitored pressure deviates from the expected pressure evolution.

2. The vehicular liquid containment system according to claim 1, wherein the leak detection logic is further configured to:
   at an instant when the vehicle is not running, perform a measurement indicative of a quantity of liquid in the tank,
   estimate the expected pressure evolution further in function of the measurement indicative of a quantity of liquid in the tank,
   detect an event corresponding to a vehicle start,
   when a vehicle start is detected, then detect an event corresponding to a predetermined movement of liquid in the tank,
   when a predetermined movement of liquid in the tank is detected, then determine whether the monitored pressure deviates from the expected pressure evolution.

3. The vehicular liquid containment system according to claim 1, further comprising means to introduce heat in a liquid phase of the tank, wherein the leak detection logic processor is further configured to activate the means to introduce heat, and wherein the monitoring the pressure comprises monitoring the pressure subsequent to activation of the means to introduce heat.

4. The vehicular liquid containment system according to claim 1, further comprising means to promote heat transfer from a liquid phase inside the tank to a vapor phase inside the tank, wherein the leak detection logic processor is further configured to activate the means to promote heat transfer, and wherein the monitoring the pressure comprises monitoring the pressure subsequent to activation of the means to promote heat transfer.

5. The vehicular liquid containment system according to claim 4, wherein the means to promote heat transfer comprises a pump configured to pump a liquid from the tank to a vehicular system via a feed line and a sprayer arranged within a branch of the feedline, an outlet of the sprayer being arranged inside the tank, wherein the leak detection logic is configured to operate the pump to activate the sprayer, and wherein the monitoring the pressure comprises monitoring the pressure subsequent to activation of the sprayer.

6. The vehicular liquid containment system according to claim 1, further configured to determine a volatility of a liquid in the system based on an increase in pressure observed when the system is known to be sealed.

7. The vehicular liquid containment system according to claim 1, wherein the thermistors form a thermistor array.

8. A motor vehicle comprising the vehicular liquid containment system according to claim 1.

9. A method for verifying integrity of a vehicular liquid containment system including a tank, a pressure sensor configured to detect a pressure in a vapor dome inside the tank, and at least two thermistors with a first thermistor configured to detect a temperature at a first level of the tank and a second thermistor configured to detect a temperature at a second level of the tank, the method comprising:
  using the first thermistor to perform a first measurement indicative of a temperature in the vapor dome in the tank and using the second thermistor to perform a second measurement indicative of a temperature in a volume of liquid contained in the tank;
  estimating an expected pressure evolution in function of at least the first temperature measurement and at least the second temperature measurement;
  monitoring pressure sensed by the pressure sensor; and
  determining whether the monitored pressure deviates from an expected pressure evolution based on one or more measurements.

10. The method according to claim 9, further comprising:
  at an instant when the vehicle is not running, performing a measurement indicative of a quantity of liquid in the tank;
  estimating the expected pressure evolution further in function of the measurement indicative of a quantity of liquid in the tank;
  detecting an event corresponding to a vehicle start;
  when a vehicle start is detected, then detecting an event corresponding to a predetermined movement of liquid in the tank;
  when a predetermined movement of liquid in the tank is detected, then determining whether the monitored pressure deviates from the expected pressure evolution.

11. The method according to claim 10, wherein the performing a measurement indicative of a quantity of liquid in the tank and the detecting an event corresponding to a predetermined movement of liquid in the tank, are performed by using the thermistors.

12. The method according to claim 9, wherein the vehicular liquid containment system further includes means to introduce heat in a liquid phase of the tank, the method further comprising:
  activating the means to introduce heat, wherein the monitoring the pressure comprises monitoring the pressure subsequent to the activating of the means to introduce heat.

13. The method according to claim 9, wherein the vehicular liquid containment system further includes means to promote heat transfer from a liquid phase inside the tank to a vapor phase inside the tank, the method further comprising:
  activating the means to promote heat transfer, wherein the monitoring the pressure comprises monitoring the pressure subsequent to the activating the means to promote heat transfer.

14. The method according to claim 13, wherein the means to promote heat transfer includes a pump configured to pump a liquid from the tank to a vehicular system via a feed line and a sprayer arranged within a branch of the feed line, an outlet of the sprayer being arranged inside the tank, the method further comprising:
  operating the pump to activate the sprayer, wherein the monitoring the pressure comprises monitoring the pressure subsequent to activation of the sprayer.

15. The method according to claim 9, further comprising determining a volatility of a liquid in the system based on an increase in pressure observed when the system is known to be sealed.

16. A non-transitory computer readable medium comprising computer code means configured to cause a processor to carry out the method according to claim 9.

* * * * *